United States Patent
Zoeteweij et al.

(10) Patent No.: US 9,429,456 B2
(45) Date of Patent: Aug. 30, 2016

(54) NUCLEAR MAGNETIC FLOWMETER

(71) Applicant: Krohne AG, Basel (CH)

(72) Inventors: Marco Leendert Zoeteweij, Hendrik-Ido-Ambacht (NL); Olaf Jean Paul Bousché, Dordrecht (NL); Cornelis Johannes Hogendoorn, Spijk (NL); Ariël de Graaf, Utrecht (NL); Jan Teunis Aart Pors, Oud-Beijerland (NL); Jan-Willem Ramondt, Breda (NL)

(73) Assignee: Krohne AG, Basel (CH)

( * ) Notice: Subject to any disclaimer, the term of this patent is extended or adjusted under 35 U.S.C. 154(b) by 534 days.

(21) Appl. No.: 13/943,108

(22) Filed: Jul. 16, 2013

(65) Prior Publication Data
US 2014/0028310 A1 Jan. 30, 2014

(30) Foreign Application Priority Data

Jul. 16, 2012 (DE) .......................... 10 2012 013 935

(51) Int. Cl.
*G01V 3/00* (2006.01)
*G01F 1/716* (2006.01)

(52) U.S. Cl.
CPC ...................................... *G01F 1/716* (2013.01)

(58) Field of Classification Search
USPC ........................................................ 324/306
See application file for complete search history.

(56) References Cited

U.S. PATENT DOCUMENTS

| | | | |
|---|---|---|---|
| 4,862,128 A | 8/1989 | Leupold | |
| 5,684,399 A | 11/1997 | Bayer | |
| 6,320,488 B1* | 11/2001 | Leupold | G01R 33/383 335/306 |
| 6,535,092 B1* | 3/2003 | Hurley | C30B 15/305 117/917 |
| 6,577,125 B2* | 6/2003 | Prammer | G01V 3/32 324/303 |
| 6,737,864 B2* | 5/2004 | Prammer | G01V 3/32 324/300 |
| 6,989,730 B1* | 1/2006 | Leupold | H01F 7/0278 335/306 |
| 7,501,819 B2 | 3/2009 | Ong | |
| 7,872,474 B2 | 1/2011 | Pusiol et al. | |
| 8,525,627 B2 | 9/2013 | Higuchi | |
| 2008/0174309 A1 | 7/2008 | Pusiol et al. | |
| 2015/0338256 A1* | 11/2015 | Hogendoorn | G01F 1/716 324/306 |
| 2016/0011032 A1* | 1/2016 | Hogendoorn | G01F 1/74 324/306 |

FOREIGN PATENT DOCUMENTS

| | | |
|---|---|---|
| DE | 102006031425 A1 | 1/2008 |
| DE | 102006032896 A1 | 1/2008 |

* cited by examiner

*Primary Examiner* — Rodney Fuller
(74) *Attorney, Agent, or Firm* — David S. Safran

(57) ABSTRACT

A magnetization device with a magnetic field which is generated by permanent magnets for variable magnetization of a medium flowing through a tube over a magnetization distance along the longitudinal axis of the tube. The magnetization device improves the quality of the results relative to known nuclear magnetic resonance measurement and analysis methods in that the magnetic field in the medium has a single direction over the magnetization distance.

17 Claims, 7 Drawing Sheets

NUCLEAR MAGNETIC FLOWMETER

BACKGROUND OF THE INVENTION

1. Field of the Invention

The invention relates to a nuclear magnetic flowmeter for measuring the flow rate of a medium flowing through a measuring tube, with a magnetization apparatus for magnetization of the medium flowing through the measuring tube over a magnetization distance along the longitudinal axis of the measuring tube, the magnetization apparatus for producing the magnetic field which is used to magnetize the medium being provided with permanent magnets and having at least two magnetization segments which are located in succession in the direction of the longitudinal axis of the measuring tube.

2. Description of Related Art

The atomic nuclei of the elements which have a nuclear spin also have a magnetic moment which is caused by the nuclear spin. The nuclear spin can be construed as an angular momentum which can be described by a vector, and accordingly, the magnetic moment can also be described by a vector which is parallel to the vector of the angular momentum. The vector of the magnetic moment of an atomic nucleus in the presence of a macroscopic magnetic field is aligned parallel to the vector of the macroscopic magnetic field at the location of the atomic nucleus. The vector of the magnetic moment of the atomic nucleus precesses around the vector of the macroscopic magnetic field at the location of the atomic nucleus. The frequency of the precession is called the Larmor frequency $\omega_L$ and is proportional to the amount of the magnetic field strength B. The Larmor frequency is computed according to $\omega_L = \gamma \cdot B$. In the latter $\gamma$ is the gyromagnetic ratio which is maximum for hydrogen nuclei.

Measurement and analysis methods which use the property of the precession of atomic nuclei with a magnetic moment in the presence of a macroscopic magnetic field are called nuclear magnetic resonance measurement or analysis methods. Usually, the voltages induced into a sensor coil by the processing atomic nuclei under various boundary conditions are used as the output variable for the measurement and analysis methods. One example for measuring instruments which use nuclear magnetic resonance is the nuclear magnetic flowmeters which measure the flow rate of a multiphase medium flowing through the measuring tube and which analyze the medium.

The prerequisite for an analysis using nuclear magnetic resonance is that the phases of the medium which are to be analyzed can be excited to distinguishable nuclear magnetic resonances. The analysis can comprise the flow velocities of the individual phases of the multiphase medium and the relative proportions of the individual phases in the multiphase medium. Nuclear magnetic flowmeters can be used, for example, to analyze the multiphase medium extracted from oil sources. The medium consists essentially of the crude oil, natural gas and salt water phases, all of which contain hydrogen nuclei.

The medium extracted from oil sources can also be analyzed with so-called test separators. Test separators branch off a small part of the extracted medium, separate the individual phases of the medium from one another and determine the proportions of the individual phases in the medium. However, test separators are not able to reliably measure proportions of crude oil smaller than 5%. Since the proportion of crude oil of each source continuously drops and the proportion of crude oil of a host of sources is already less than 5%, it is not currently possible to economically exploit these sources using test separators. In order to also be able to exploit sources with a very small proportion of crude oil, correspondingly accurate flowmeters are necessary.

It is immediately apparent from the equation for computing the Larmor frequency $\omega_L$ that the Larmor frequency $\omega_L$ is proportional to the amount of magnetic field strength B of the macroscopic magnetic field in the medium to be studied and thus the amount of the magnetic field strength also acts directly on the frequency of the voltage which has been induced into the sensor coil. The direction of the macroscopic magnetic field with reference to the orientation of the sensor coil also influences the voltages induced in the sensor coil. In general, deviations of the macroscopic magnetic field which is permeating the medium from the ideal of the homogeneous magnetic field lead to a reduced measurement quality and thus to inaccurate measurement results.

Desired and known gradients of the magnetic field in the medium are expressly accepted from these unwanted deviations.

Examination of magnetic fields with gradients is omitted since the following statements can obviously be applied to magnetic fields with gradients.

U.S. Pat. No. 7,872,474 B2 discloses a nuclear magnetic flowmeter on which the invention is based. It applies to the magnetization elements which belong to the magnetization apparatus that they are made hollow-cylindrical and have a homogeneous magnetic field in their interiors. The magnetization segments are arranged in succession on the measuring tube such that their concentric longitudinal axes coincide with the longitudinal axis of the measuring tube. The magnetization of the medium flowing through the measuring tube can be set differently, therefore can be varied by the homogeneous magnetic fields of the individual magnetization segments being aligned either parallel or anti-parallel to one another.

FIGS. 7(a)-7(c) of U.S. Pat. No. 7,872,474 B2, in particular, show a magnetization apparatus with six successively arranged magnetization segments. In the implementation according to 7(a) all magnetization segments are set such that the homogeneous magnetic fields of the individual magnetization segments are aligned parallel to one another in the medium. Conversely in the implementation according to 7(b), three magnetization segments at a time are combined into a group. Within each group the homogeneous magnetic fields of the magnetization segments are aligned parallel to one another. But, the homogeneous magnetic fields of one group are aligned anti-parallel to the homogeneous magnetic fields of the other group. Finally, according to 7(c), again, two groups of magnetization segments are also formed, but one group with four magnetization segments and the other group with two magnetization segments. It also applies here that the homogeneous magnetic fields of the individual magnetization segments in each group are aligned parallel to one another, the homogeneous magnetic fields of the individual magnetization elements of one group, however, being aligned anti-parallel to the homogeneous magnetic fields of the magnetization segments of the other group.

SUMMARY OF THE INVENTION

Based on the above described prior art in particular, a primary object of this invention is to devise a nuclear magnetic flowmeter which has been improved with reference to the attainable quality of the measurement results.

The nuclear magnetic flowmeter in accordance with the invention, first of all, is characterized essentially in that the magnetic field has the same direction or all magnetic fields have the same direction at a magnetic field strength which is different over the length of the magnetization distance in the medium over the entire magnetization distance.

The improvement of the attainable quality of the measurement results by the magnetic field having the same direction or all magnetic fields having the same direction even at a magnetic field strength which is different over the length of the magnetization distance in the medium over the entire magnetization distance. A nuclear magnetic flowmeter which is made in accordance with the invention determines, for example, the flow velocities of the individual phases of the medium and the relative proportions of the individual phases in the multiphase medium in the measuring tube more accurately than a nuclear magnetic flowmeter which is not made in accordance with the invention, which is made, for example, as was described in particular above.

It is pointed out here that, within the scope of the invention, it is primarily a nuclear magnetic flowmeter which characterizes the invention, but which is not limited to use for nuclear magnetic flowmeters, and can also be used in some other way, for example, quite in general, in the petrochemical or chemical industry.

Of course, there are various possible embodiments and developments of the nuclear magnetic flowmeter in accordance with the invention.

If it has been stated above that, in accordance with the invention, the magnetic field has the same direction or all magnetic fields have the same direction over the entire magnetization distance in the medium, but this does not mean that this same direction can only be a quite specific one. Rather, the magnetic field or all magnetic fields can have any direction with the limitation that they all have the same direction.

One quite especially preferred embodiment of the nuclear magnetic flowmeter in accordance with the invention is additionally characterized in that each of the magnetization segments has an inner carrier which is equipped with permanent magnets and an outer carrier which is equipped with permanent magnets and the inner carrier is placed around the measuring tube and the outer carrier is placed around the inner carrier and that for variation of the magnetic field strength in the medium, and thus, also for variation of the magnetization of the medium, the orientation between the inner carrier and the outer carrier can be adjusted by rotation of the inner carrier and/or the outer carrier around an axis of rotation of a segment, usually the axis of rotation of the segment coinciding with the longitudinal axis of the measuring tube.

In the especially preferred embodiment of a nuclear magnetic flowmeter in accordance with the invention which was described last, by rotation of the inner carrier and/or the outer carrier around the axis of rotation of a segment, the magnetic field strength in the medium which arises by superposition of the magnetic field generated by the permanent magnets of the inner carrier and of the magnetic field generated by the permanent magnets of the outer carrier can be adjusted. The magnetization of the medium flowing through the measuring tube can also be adjusted by this adjustability of the magnetic field strength over the magnetization distance.

In the special embodiment of the nuclear magnetic flowmeter in accordance with the invention in which, as described above, there are an inner carrier and an outer carrier, the magnetic field strength resulting solely from the inner carrier and the magnetic field strength resulting solely from the outer carrier can be different. But preferably, the magnetic field strength resulting solely from the inner carrier and the magnetic field strength resulting solely from the outer carrier are the same. Then, with consideration of the primary teaching of the invention, in the above described especially preferred embodiment of a nuclear magnetic flowmeter in which there are an inner carrier and an outer carrier, there are two adjustment possibilities. One adjustment possibility is characterized in that the magnetic fields of the inner carrier and outer carrier are "added" to each other, the resulting magnetic field therefore having a magnetic field strength which is twice as great as the magnetic field strength implemented by the inner carrier and the magnetic field strength implemented by the outer carrier. In the other adjustment possibility in which then the orientation between the inner carrier and the outer carrier is different by 180° compared to the above described adjustment possibility, the magnetic fields mutually cancel one another so that a magnetic field is not active in the medium.

The orientation between the inner carrier and the outer carrier can be implemented in that both the inner carrier and also the outer carrier are rotated around the axis of rotation of the segment. But preferably, the inner carrier is stationary with respect to the measuring tube, and the outer carrier, located concentrically around the inner carrier, can be rotated around the axis of rotation of the segment. The rotary implementation of the outer carrier relative to the inner carrier is advantageous relative to the rotary arrangement of the inner carrier with respect to the outer carrier because the inner carrier is covered by the outer carrier and therefore the actuation of the outer carrier can be more easily implemented than the actuation of the inner carrier.

The mounting of the outer carrier to be able to turn around the axis of rotation of a segment can be implemented by the inner carrier on each of its two ends with reference to the axis of rotation of a segment being connected securely to one segment carrier at a time and the outer carrier with the segment carriers forming at least one axial slide bearing, while the outer carrier with the inner carrier forming at least one radial slide bearing. The freedom of movement of the outer carrier which remains due to the axial slide bearing and the radial slide bearing is the capacity of the outer carrier to rotate around the axis of rotation of the segment.

The actuation of the pivotally mounted outer carrier can take place by an actuator. The actuator can comprise a ring gear which is located on the outer carrier concentric to the axis of rotation of the segment, a pinion which engages the ring gear, and an electric motor which turns the pinion. By triggering the electric motor, the torque applied by the electric motor is transferred via the pinion to the ring gear so that the outer carrier is turned with reference to the inner carrier. The electric motors can be synchronous motors, and preferably stepping motors.

If there is an actuator for actuation of the pivotally mounted outer carrier, the actuator can also be made to adjust the orientation with the maximum rotary field in the medium and the minimum magnetic field in the medium. When using a stepping motor, the orientation with the maximum magnetic field in the medium and with the minimum magnetic field in the medium are known by the number of steps at a given direction of rotation, proceeding from a known initial orientation. The initial orientation can be detected by a vane on the outer carrier and a photoelectric barrier which does not turn concomitantly. Alternatively, the orientation with the maximum magnetic field in the medium and with the minimum magnetic field in the medium can also be signaled by vanes and photoelectric barriers. Then, the use of a stepping motor is not necessary, and for example, a synchronous motor can be used. Of course, also other orientations between the inner carrier and the outer carrier can be reproducibly adjusted with the aforementioned means.

In another preferred embodiment of the invention, the medium is magnetized by a magnetization segment of a second type which is equipped with permanent magnets, in which the magnetic resistance can be adjusted for variation of the magnetic field strength in the medium, and thus, also for variation of the magnetization of the medium. The adjustability of the magnetic resistance can be, for example, implemented in that the magnetization segment is formed of a first partial segment and of a second partial segment and are spaced by the partial segments. The gap which arises between the first partial segment and the second partial segment with spacing constitutes the magnetic resistance of the magnetization segment and can be adjusted via the size of the gap. In doing so, an enlargement of the gap leads to a greater magnetic resistance and the latter to a decrease of the magnetic field strength in the medium. If the magnetic flux which is permeating the medium is also flowing through a yoke, the magnetic resistance in this yoke can also be influenced. For example, there can be a slot in this yoke through which the magnetic flux is flowing, and by pushing a filler of good magnetic conductivity into the slot or pulling it out of the slot, the magnetic resistance can be adjusted.

In another preferred embodiment of the invention, the magnetization device or at least one magnetization segment is arranged to be able to move along the longitudinal axis of the measuring tube. The magnetization of the medium can be adjusted on the measurement device by the adjustable distance of a magnetization device or of the magnetization segment along the longitudinal axis of the measuring tube to the measurement device. In this way, measurements with different magnetizations of the medium can be taken.

Heretofore, with respect to the generation of the magnetic field by the described magnetization apparatus, it was simply stated that it is generated by permanent magnets. One quite especially preferred possibility of generating the magnetic field by permanent magnets arises by the arrangement of the permanent magnets as a Halbach array. In the magnetization segment, then, both the permanent magnets of the inner carrier are arranged as a Halbach array and also the permanent magnets of the outer carrier are arranged as a Halbach array. Here, the magnetic field of the inner carrier extends outside of the inner carrier essentially into the interior of the inner carrier. Accordingly, the magnetic field of the outer carrier extends outside the outer carrier essentially into the interior of the outer carrier.

In the magnetization devices in accordance with the invention which were presented above, the magnetization of the medium flowing through the measuring tube takes place solely by magnetic fields generated by permanent magnets. The variation of the magnetic field strength in the medium takes place by rotation of the outer carrier and of the inner carrier to one another and optionally by variation of the magnetic resistance. Here, the variation of the magnetic field strength takes place by mechanical changes on the magnetization apparatus.

In one alternative embodiment of the invention, to vary the magnetic field strength in the medium, and thus, to vary the magnetization of the medium, there is at least one electromagnet arranged on the magnetization apparatus such that the magnetic field of the electromagnet is aligned parallel or anti-parallel to the magnetic field of the magnetization apparatus. The electromagnet thus makes it possible to reduce the field which is present in the medium either by the magnetic field strength which has been generated by the electromagnet or to increase the magnetic field strength by the magnetic field strength which has been generated by the electromagnet. Mechanical changes for variation of the magnetic field strength in the medium are therefore no longer necessary.

In particular, at this point, there are different possibilities for developing and embodying the nuclear magnetic flowmeter in accordance with the invention. For this purpose, reference is made to the description of a preferred exemplary embodiment of the magnetization apparatus of the nuclear magnetic flowmeter in accordance with the invention in conjunction with the accompanying drawings.

DETAILED DESCRIPTION OF THE INVENTION

Figure 1A:
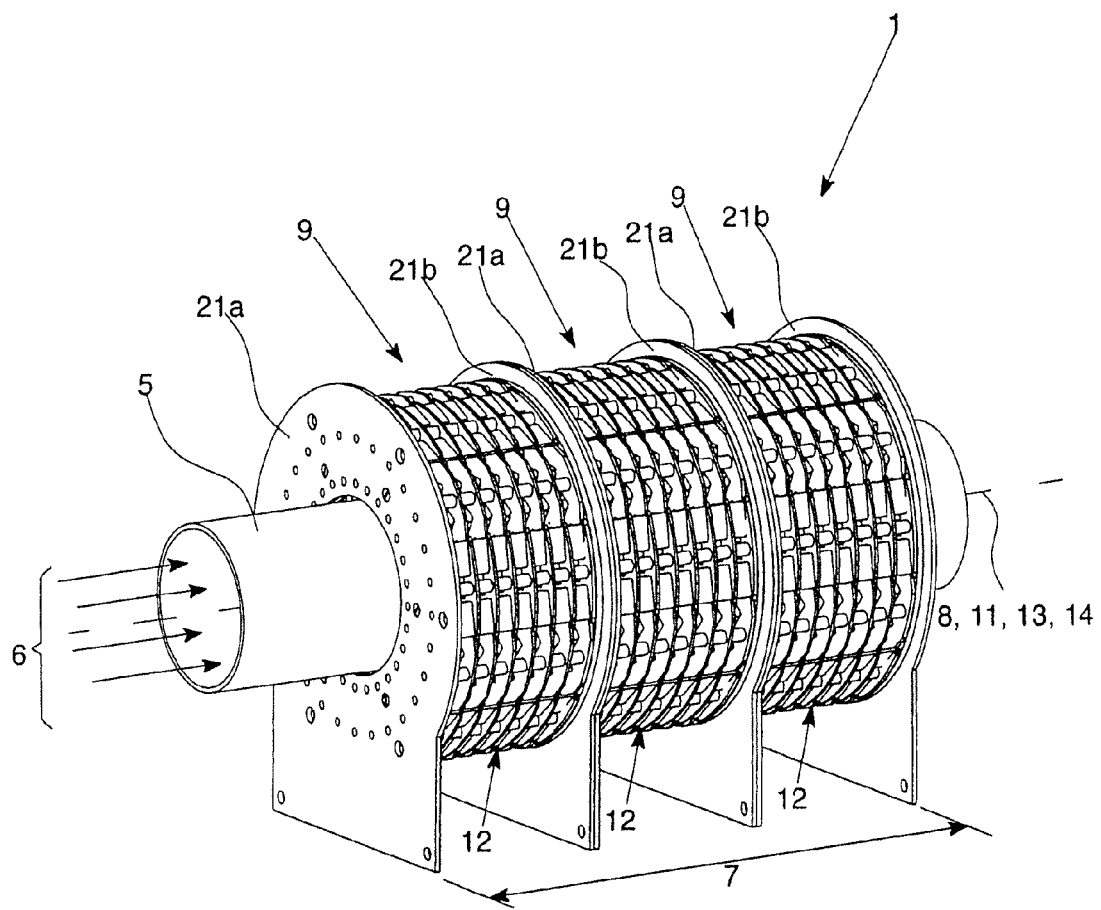
FIG. 1a is a perspective view of one exemplary embodiment of a magnetization apparatus with three magnetization segments.

A nuclear magnetic flowmeter for measuring a medium 6 flowing through a measuring tube 5, in accordance with the invention, comprises a magnetization apparatus 1 for magnetization of the medium 6 flowing through the measuring tube 5 over a magnetization distance 7 along the longitudinal axis 8 of the measuring tube 5. Here, the magnetization apparatus 1 for producing the magnetic field 3, 4 for magnetizing the medium 6 is provided with permanent magnets 2, and the magnetization apparatus 1 has at least two magnetization segments 9 which are located in succession in the direction of the longitudinal axis 8 of the measuring tube 5 represented by the broken line in FIG. 1a and the central circle in FIG. 1b.

In accordance with the invention the magnetic field 3, 4 in the medium 6 has the same direction over the entire magnetization distance 7.

The figures show one exemplary embodiment of a magnetization apparatus 1 which belongs to the nuclear magnetic flowmeter in accordance with the invention, FIG. 1a showing the magnetization apparatus 1 in its totality.

Figure 1B:
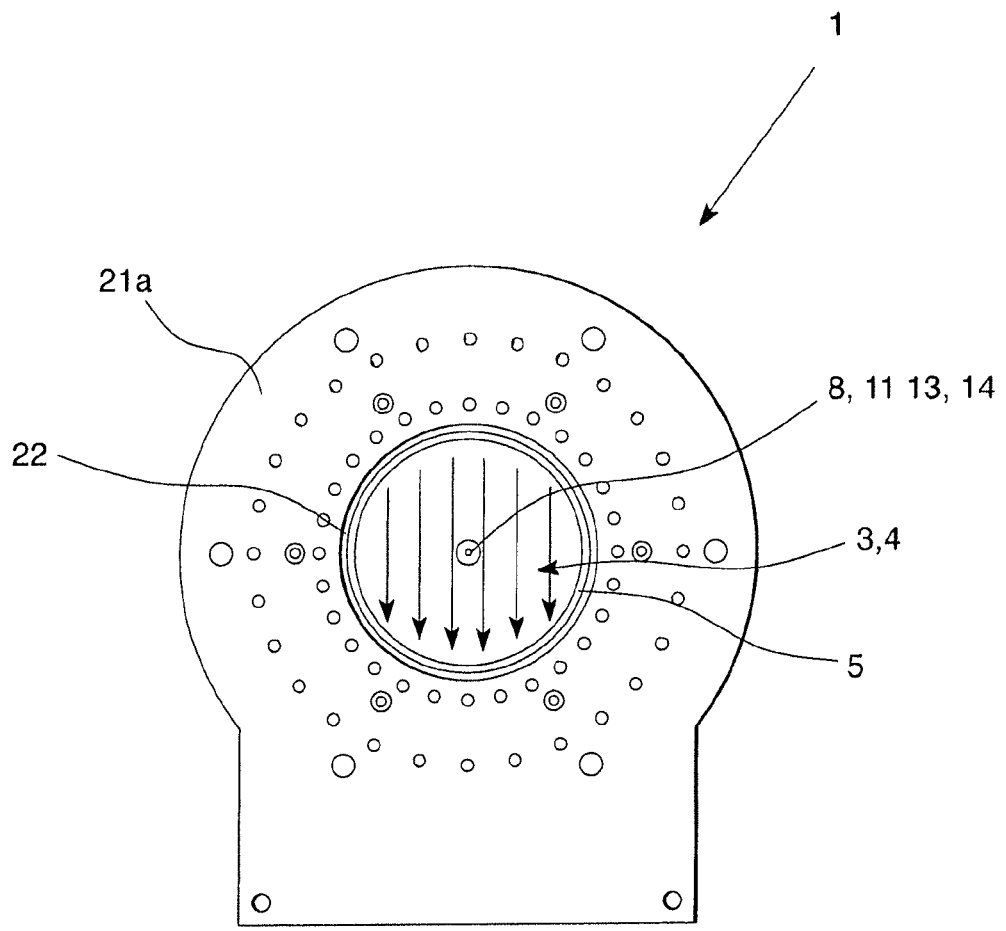
FIG. 1b shows an end view of the magnetization apparatus from FIG. 1a, FIG. 2a is a perspective view of one of the magnetization segments of the magnetization apparatus from FIG. 1a, FIG. 2b is an exploded perspective view of the magnetization segment from FIG. 2a, FIG. 3 is a perspective view of the inner magnet carrier and the outer magnet carrier of the magnetization segment from FIG. 2b.
Figure 2A:
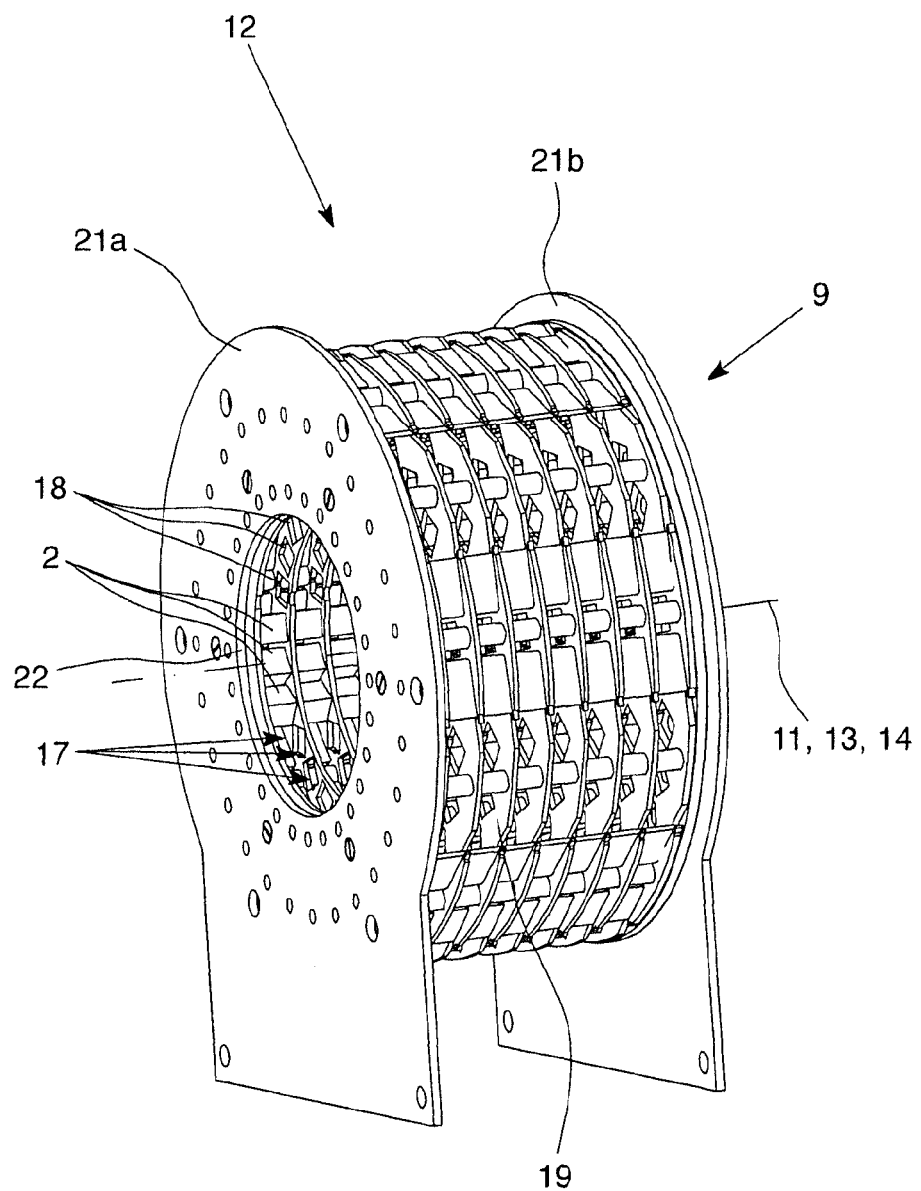
Figure 4A:
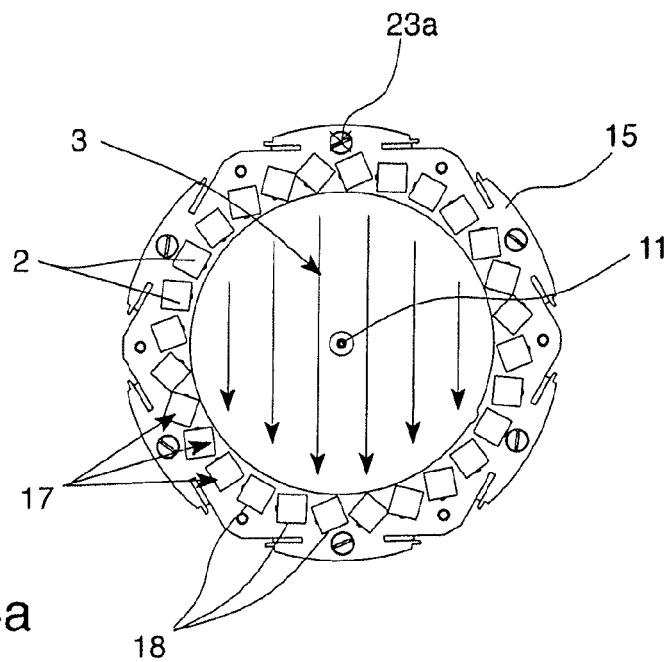
FIG. 4a shows the magnetic field in the interior of the inner magnet carrier from FIG. 3.
Figure 4B:
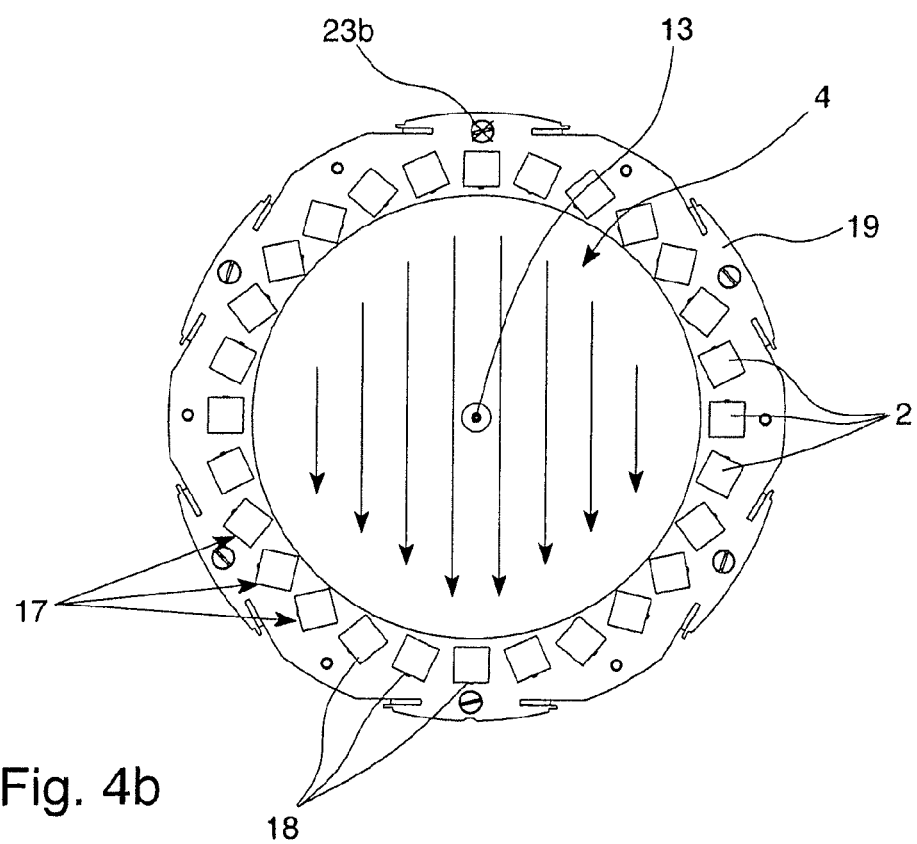
FIG. 4b shows the magnetic field in the interior of the outer magnet carrier from FIG. 3.
Figure 5A:
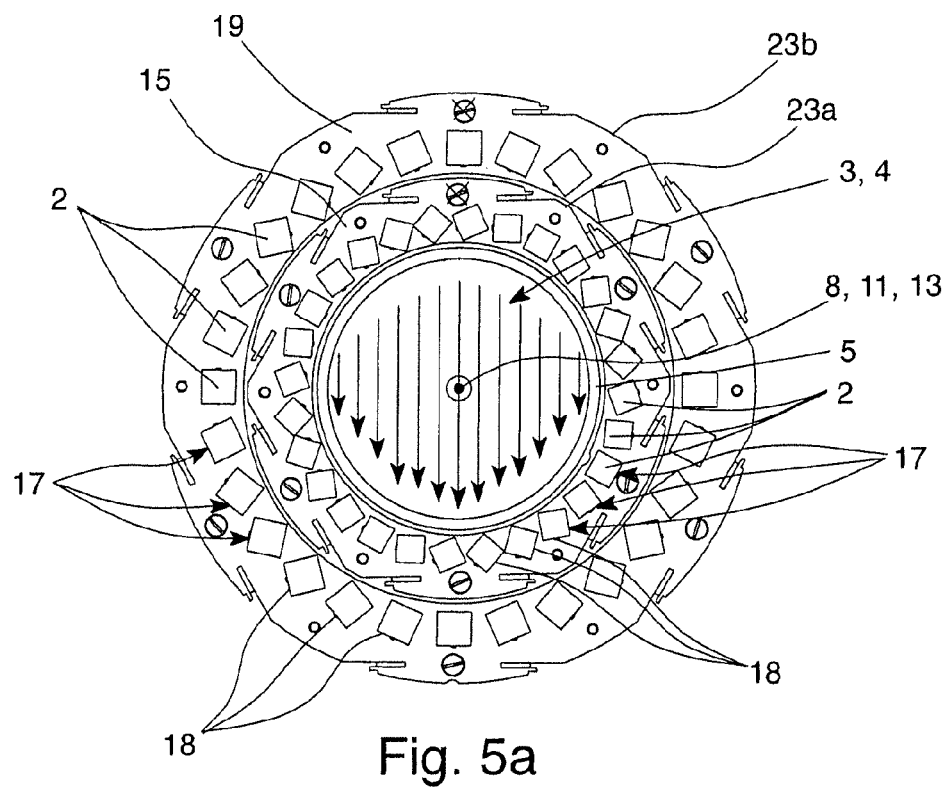
FIG. 5a shows the magnetic field which results in the interior of the inner carrier of the magnetization segment from FIG. 2a in a first orientation between the inner carrier and the outer carrier.
Figure 5B:
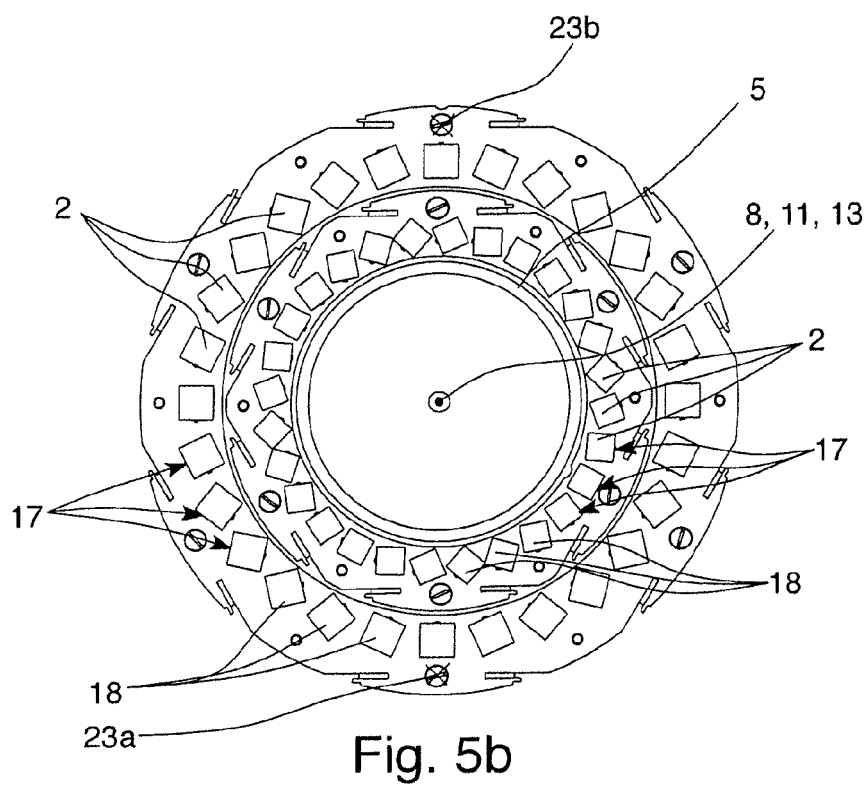
FIG. 5b shows the magnetic field which results in the interior of the inner carrier of the magnetization segment from FIG. 2a in a second orientation between the inner carrier and the outer carrier.

A plurality of bar-shaped permanent magnets 2, see FIGS. 2a, to 5b, generates a magnetic field 3, 4, see FIGS. 1b and 3 to 5b, which permeates a medium 6 which is flowing through a measuring tube 5. The terrestrial magnetic field remains ignored. The permeation of the medium 6 with the magnetic field 3, 4 takes place over a magnetization distance 7 which extends along the longitudinal axis 8 of the measuring tube 5. Of course, the measuring tube 5, at least over the magnetization distance 7, is of a material which does not influence magnetic fields. The magnetization of the flowing medium 6 takes place during the residence time of the medium 6 in the region of the magnetization distance 7, which residence time follows from the length of the magnetization distance 7 and the flow velocity of the medium 6.

The magnetization apparatus 1 is modular, composed of individual magnetization segments 9, i.e., it can comprise any number of magnetization segments 9. The exemplary embodiment comprises three magnetization segments 9, see FIG. 1a, but due to the modularity it could also have fewer or more magnetization segments 9.

In the illustrated exemplary embodiment, the three magnetization segments 9 each form partial magnetization distances of the same length which together form the magnetization distance 7. The magnetic field 3, 4 which has been generated by the permanent magnets 2 in the medium 6 over the magnetization distance 7 has only a single direction, see FIG. 1b. Here, if a single direction of the magnetic field 3, 4 in the medium 6 over the magnetization distance 7 is addressed, this does not preclude fluctuations of the direction. But, the fluctuations of the direction are so small that the desired measurement accuracy is achieved. Edge effects of the magnetic field 3, 4, as occur, for example, on the ends of the magnetization distance 7, are not shown in the figures.

Figure 2B:
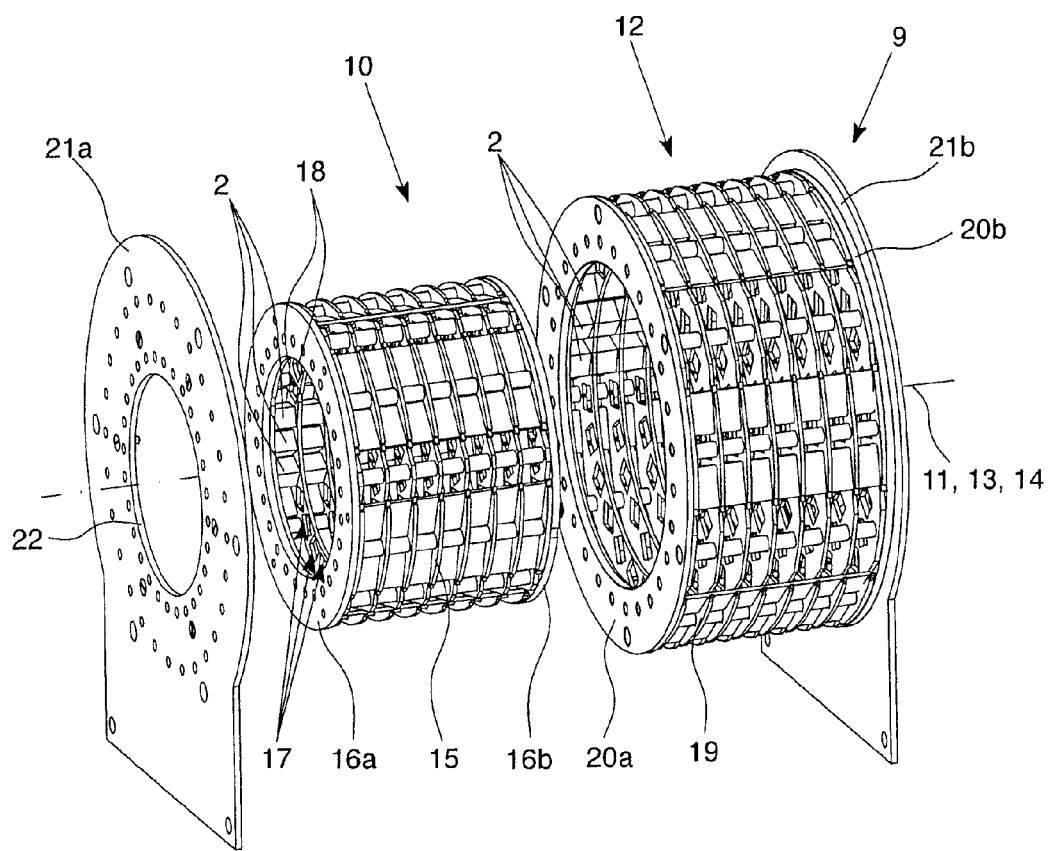

FIGS. 2a and 2b show the important components of each of the three magnetization segments 9, FIG. 2a showing the magnetization segment 9 in the assembled state and FIG. 2b showing the magnetization segment 9 in an exploded view. The magnetization segment 9 comprises a fundamentally hollow cylindrical inner carrier 10 with a concentric longitudinal axis 11 and a fundamentally hollow cylindrical outer carrier 12 with a concentric longitudinal axis 13, the outer carrier 12 being able to rotate around the axis 14 of rotation of the segment, the axes 11, 13, 14 being coincident with each other and with axis 8 as shown in FIG. 1b.

The inner carrier 10 is composed essentially of a fundamentally hollow cylindrical inner magnet carrier 15 and two disk ring-shaped inner rings 16a, 16b and the inner radius of the inner carrier 10 around the longitudinal axis 11 of the inner carrier is larger than the outer radius of the measuring tube 5. There is a plurality of bar magnet receivers 17 in the inner magnet carrier 15. Each of the bar magnet receivers 17 has an axis which is parallel to the longitudinal axis 11 of the inner carrier and is comprised of a plurality of bar magnet recesses 18 which are provided concentrically to their respective axis. The bar magnet receivers 17 extend over the entire length of the inner magnet carrier 15, and all bar magnet recesses 18 of the bar magnet receiver 17 have the same rectangular inner cross section. When the length of a body is being addressed, the extension of the body along its longitudinal axis is meant. The bar-shaped permanent magnets 2 are inserted into the bar magnet receivers 17. The permanent magnets 2 are pushed into the bar magnet receivers 17 from one end face of the inner magnet carrier 15 or the other, and the length of the inserted permanent magnets 2 corresponds to the length of the inner magnet carrier 15. The inner cross sections of the bar magnet recesses 18 are matched to the outer cross sections of the permanent magnets 2 such that the inner magnet carrier 15 aligns the permanent magnets 2 which have been inserted into the bar magnet receivers 17 to be unable to rotate around their respective longitudinal axis. The inner magnet carrier 15 does not prevent movements of the inserted permanent magnets 2 in the direction of the longitudinal axis 11 of the inner carrier, for which reason the inserted permanent magnets 2 can be moved in this direction.

The inner ring 16a is connected tightly to one end face, the inner ring 16b to the other end face of the inner magnet carrier 15 by screw connections. The inner rings 16a, 16b, which are connected to the inner magnet carrier 15, prevent movements of the inserted permanent magnets 2 in the direction of the longitudinal axis 11 of the inner carrier. The inserted permanent magnets 2 are completely fixed by the cross-sectional surfaces of the inserted permanent magnets 2 and the bar magnet receivers 18, which surfaces are matched to one another, and by the inner rings 16a, 16b. The surface of each of the inner rings 16a, 16b which faces outward lies in a plane which is perpendicular to the longitudinal axis 11 of the inner carrier. The concentric surface of the inner ring 16a which faces outward and the concentric surface of the inner ring 16b which faces outward lie in a common inner circular cylinder surface which is not penetrated by the inner magnet carrier 15. The inner magnet carrier 15 and the inner rings 16a, 16b which are connected to it are aligned concentrically with respect to the longitudinal axis 11 of the inner carrier.

The outer carrier 12 is comprised essentially of a fundamentally hollow cylindrical outer magnet carrier 19 and two disk ring-shaped outer rings 20a, 20b. There is a plurality of bar magnet receivers 17 in the outer magnet carrier 19. Each of the bar magnet receivers 17 has an axis which is parallel to the longitudinal axis 13 of the outer carrier and has a plurality of bar magnet recesses 18 which are provided concentrically relative to their respective axis. The bar magnet receivers 17 extend over the entire length of the outer magnet carrier 19, and all bar magnet recesses 18 belonging to the bar magnet receiver 17 have the same rectangular inner cross section. The rectangular bar-shaped permanent magnets 2 are inserted into the bar magnet receivers 17. The permanent magnets 2 are pushed into the bar magnet receivers 17 from an end face of the outer magnet carrier 19, and the length of the inserted permanent magnets 2 corresponds to the length of the outer magnet carrier 19. The inner cross sections of the bar magnet recesses 18 are matched to the outer cross sections of the permanent magnets such that the outer magnet carrier 19 aligns the permanent magnets 2 which have been inserted into the bar magnet receivers 17 to be unable to rotate around their respective longitudinal axis. The inner magnet carrier 15 does not prevent movements of the inserted permanent magnets 2 in the direction of the longitudinal axis 13 of the outer carrier, for which reason the inserted permanent magnets 2 can be moved in this direction.

The outer ring 20a is connected tightly to one end and the outer ring 20b to the other end of the outer magnet carrier 19 by screw connections. The outer rings 20a, 20b which are connected to the outer magnet carrier 19 prevent movements of the inserted permanent magnets 2 in the direction of the longitudinal axis 13 of the outer carrier. The inserted permanent magnets 2 are completely fixed by the cross sectional surfaces of the inserted permanent magnets 2 and the bar magnet recesses 18, which surfaces are matched to one another, and by the outer rings 20a, 20b. The surface of each of the outer rings 20a, 20b which faces outward lies in a plane which is perpendicular to the longitudinal axis 13 of the outer carrier. The concentric surface of the outer ring 20*a* which faces outward and the concentric surface of outer ring 20*b* which faces inward lie in a common outer circular cylinder surface which is not penetrated by the outer magnet carrier 19. The outer magnet carrier 19 and the inner rings 20*a*, 20*b* which are connected to it are aligned concentrically relative to the longitudinal axis 13 of the outer carrier.

The length of the inner carrier 10 is slightly less than the length of the outer carrier 12 and the radius of the outer circular cylinder surface is slightly larger than the radius of the inner circular cylinder surface. The inner carrier 10 and the outer carrier 12 are joined by the outer carrier 12 being routed over the inner carrier. In the joined state, the longitudinal axis 11 of the inner carrier and the longitudinal axis 13 of the outer carrier coincide and the surfaces of the inner rings 16*a*, 16*b*, which face outward, project slightly beyond the surfaces of outer rings 20*a*, 20*b* that face outward.

Each of the magnetization segments 9 comprises essentially, in addition to the inner carrier 10 and the outer carrier 12, two planar plate-shaped segment carriers 21*a*, 21*b*. In each of the segment carriers 21*a*, 21*b*, there is a circular recess 22 through which the measuring tube 5 is routed. The segment carrier 21*a* is connected securely by screw connections to the inner ring 16*a* and the segment carrier 21*b* is connected securely by screw connections to the inner ring 16*b*. The extension of the segment carriers 21*a*, 21*b* in a plane perpendicular to the longitudinal axis 11 of the inner carrier projects over the extension of the outer carrier 12 in this plane.

Movements of the outer carrier 12 in the direction which is radial to the longitudinal axis 13 of the outer carrier with reference to the inner carrier 10 are hindered by two radial slide bearings. The first radial slide bearing is formed by the radial surface of the outer ring 20*a* which faces inward together with the radial surfaces of the inner ring 16*a* which face outward, and the second radial slide bearing is formed by the radial surface of the outer ring 20*b* which faces inward together with the radial surfaces of the inner ring 16*b* which face outward.

Movements of the outer carrier 12 in the direction which is axial to the longitudinal axis 13 of the outer carrier with reference to the inner carrier 10 are hindered by two axial slide bearings. The first axial slide bearing is formed by the surface of the outer ring 20*a* which faces outward together with the surface of the segment carrier 21*a* which faces inward, and the second axial slide bearing is formed by the surface of the outer ring 20*b* which faces outward together with the surface of the segment carrier 21*b* which faces inward.

The solely remaining freedom of movement of the outer carrier 12 with reference to the inner carrier 10 is rotation around the longitudinal axis 13 of the outer carrier. The longitudinal axis 14 of the segment, by definition, coincides with the longitudinal axis 13 of the outer carrier. The aforementioned slight difference of the radii of the outer circular cylinder surface and the inner circular cylinder surface is such that the function of the radial slide bearing is ensured and the aforementioned slight difference of the lengths of the inner carrier 10 and of the outer carrier 12 is such that the function of the axial slide bearing is ensured. The surfaces of the radial slide bearing and of the axial slide bearing which are in contact with one another are made such that, when the outer carrier 12 rotates with reference to the inner carrier 10, the wear and the torque which is required for rotation are as small as possible.

Figure 3:
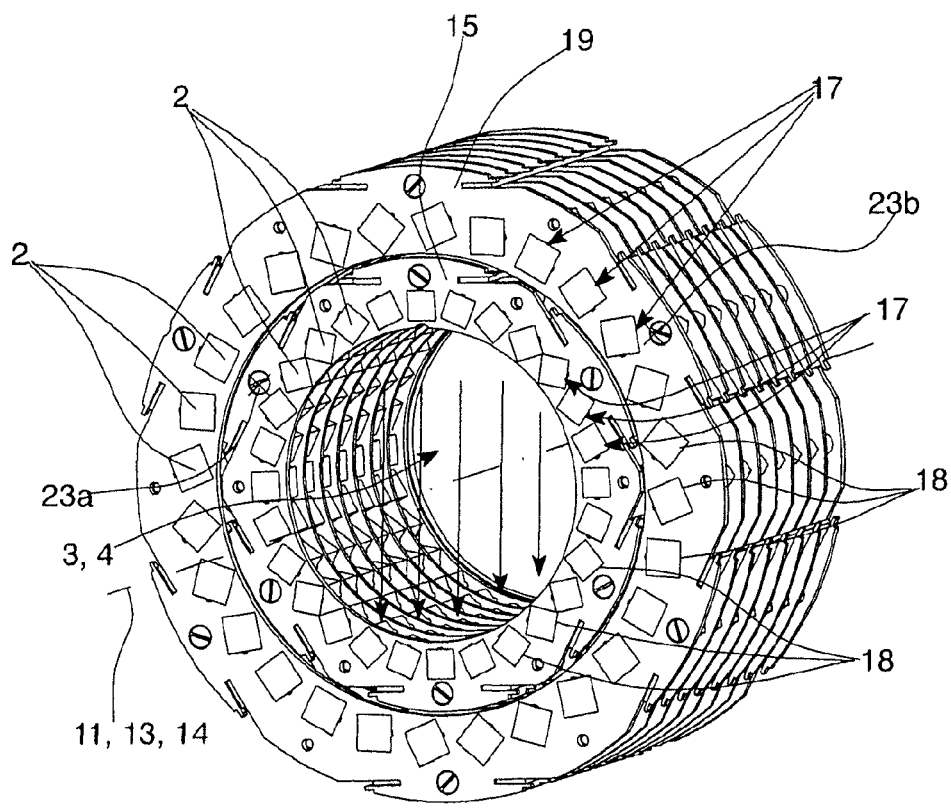

FIG. 3 shows the inner magnet carrier 15 and the outer magnet carrier 19 in the joined state with the inserted permanent magnets 2. The magnetic field 3, 4 in the cylindrical interior of the inner magnet carrier 15 results from the superposition of the magnetic field 3 of the permanent magnets 2 of the inner magnet carrier 15 and of the magnetic field 4 of the permanent magnets 2 of the outer magnet carrier 19. The magnetic field strength of the magnetic field 3, 4 in the medium 6 along any line parallel to the axis 14 of rotation of the segment is constant over the length of the magnetization segment 9. Moreover, the magnetic field 3, 4 is homogeneous over the length of the magnetization segment 9. If a constant magnetic field strength or homogeneity of the magnetic field 3, 4 in the medium 6 over the length of the magnetization segment 9 is addressed here, this does not preclude fluctuations of the magnetic field strength and inhomogeneities of the magnetic field 3, 4. But, the fluctuations of the magnetic field strength and inhomogeneities are so small that the desired measurement accuracy is achieved.

The orientation of the outer magnet carrier 19 with reference to the inner magnet carrier 15 is characterized by an orientation mark 23*a* on the face of the inner magnet carrier 15 and by an orientation mark 23*b* on the face of the outer magnet carrier 19. The radial distance of the inner magnet carrier 15 from the measuring 5 and the radial distance of the outer magnet carrier 19 from the inner magnet carrier 15 are as small as possible. Due to the short distances, the volume which is to be permeated with the magnetic field 3, 4 and in which the measuring tube 5 is located is minimum, and accordingly, the magnetic flux which is to be applied by the permanent magnets 2 is also minimum. Larger radial distances would accordingly require more permanent magnet material.

FIG. 4*a* shows the inner magnet carrier 15 with the inserted permanent magnets 2 in an end view. The inner magnet carrier 15 aligns the inserted permanent magnets 2 into a Halbach array whose magnetic field 3 extends outside of the inner magnet carrier 15 essentially into the cylindrical interior of the inner magnet carrier 15 and is homogeneous in the medium 6. FIG. 4*b* shows the outer magnet carrier 19 with the inserted permanent magnets 2 in an end view. The outer magnet carrier 19 aligns the inserted permanent magnets 2 likewise into a Halbach array whose magnetic field 4 extends outside of the outer magnet carrier 19 essentially into the cylindrical interior of the outer magnet carrier 19 and is homogeneous in the medium 6. The two Halbach arrays are matched to one another such that the amounts of the strengths of the magnetic field 3 and of the magnetic field 4 in the medium 6 are the same. Due to the circumstance that the magnetic field 3 essentially does not extend into the exterior of the inner carrier 15, only the friction of the radial slide bearing and of the axial slide bearing need be overcome to rotate the outer carrier 12.

FIG. 5*a* shows the inner magnet carrier 15 and the outer magnet carrier 19 with the inserted permanent magnets 2 in a first orientation relative to one another. The magnetic field 3 and the magnetic field 4 are aligned parallel to one another. In the medium 6, the magnetic field strength of the magnetic field which results by superposition is accordingly twice as large as the magnetic field strength of the magnetic field 3 or of the magnetic field 4 considered by itself. FIG. 5*b* shows the inner magnet carrier 15 and the outer magnet carrier 19 with the inserted permanent magnets 2 in a second orientation relative to one another. The magnetic field 3 and the magnetic field 4 are aligned anti-parallel to one another. Therefore, there is no magnetic field in the medium 6. If the absence of a magnetic field in the medium 6 is addressed here, this does not preclude a magnetic field which is present in the medium 6 with a small magnetic field strength. But, the residual magnetic field strength is so small that the desired measurement accuracy is achieved.

The three magnetization segments 9 of the magnetization device 1, see FIG. 1a, are aligned relative to one another such that the axes 14 of rotation of their segments coincide with the longitudinal axis 8 of the measuring tube 5. In addition, the inner carriers 10 are oriented relative to one another such that their magnetic fields 3 are parallel. Each of the outer carriers 12 can be rotated around the longitudinal axis 8 of the measuring tube 5 independently of the other outer carriers 12, and rotation of each of the outer carriers 12 takes place by an actuator which is not visible in the figures. The actuators can set any orientations of the outer carriers 12 with reference to the inner carriers 10.

In a first method for operating the magnetization apparatus 1, the three outer carriers 12 are always oriented relative to one another by the actuators such that the magnetic fields 4 are parallel to one another. Accordingly, rotation of the three outer carriers 12 takes place with reference to the inner carriers 10 together and uniformly. By rotation of the outer carriers 12 with reference to the inner carriers 10, the magnetic field 3, 4 in the medium 6 is set over the magnetization distance 7 to any magnetic field strength between zero and twice the magnetic field strength of the magnetic field 3 or of the magnetic field 4 by itself. As a result, the magnetization of the flowing medium 6 changes accordingly. The magnetic field 3, 4 in the medium 6 over the magnetization distance 7 has only a single direction. In addition, the magnetic field strength of the magnetic field 3, 4 in the medium 6 is constant along any line parallel to the longitudinal axis 8 of the measuring tube 5 over the magnetization distance 7. Moreover, the magnetic field 3, 4 is homogeneous over the magnetization distance 7.

In a second method for operating the magnetization apparatus 1, the outer carriers 12 of the three magnetization segments 9 are oriented independently of one another. Here, only two different orientations of each of the outer carriers 12 are set with reference to its inner carrier 10. For the first orientation the magnetic field 3 and the magnetic field 4 of the respective magnetization segment 9 are aligned parallel. The magnetic field strength of the magnetic field 3, 4 in the medium 6 is twice the magnetic field strength of the magnetic field 3 or of the magnetic field 4 viewed for itself. In the second orientation the magnetic field 3 and the magnetic field 4 are aligned anti-parallel. The magnetic field strength 3, 4 in the medium 6 is zero. For magnetizations of the medium 6 which can be produced with this method, the magnetization always takes place with the same magnetic field strength in the medium 6. The magnetic field 3, 4 in the medium 6 has only a single direction, independently of the orientations of the outer carrier 12 of the individual magnetization segments 9 over the magnetization distance 7.

What is claimed is:

1. A nuclear magnetic flowmeter for measuring the flow rate of a medium flowing through a measuring tube, comprising:
    a magnetization apparatus for magnetization and for variation of the magnetization of the medium flowing through the measuring tube over a magnetization distance along a longitudinal axis of the measuring tube in a manner producing at least one magnetic field to magnetize the medium,
    the magnetization apparatus being provided with permanent magnets and
    having at least two magnetization segments which are located in succession in the direction of the longitudinal axis of the measuring tube and which produce the at least one magnetic field in a single direction and has a magnetic field strength which can be different over the length of the magnetization distance in the medium over the entire distance, and
    wherein each of the magnetization segments has an inner carrier which is equipped with permanent magnets and an outer carrier which is equipped with permanent magnets, and wherein the inner carrier is located surrounding the measuring tube and the outer carrier is placed surrounding the inner carrier, and wherein the orientation between the inner carrier and the outer carrier is adjustable by rotation of at least one of the inner carrier and the outer carrier around an axis of rotation of the respective segment for variation of the magnetic field strength in the medium and also for variation of the magnetization of the medium.

2. The nuclear magnetic flowmeter in accordance with claim 1, wherein for each of the magnetization elements, the orientation between the inner carrier and the outer carrier is settable to produce a maximum field strength in the medium and to produce a minimum field strength in the medium.

3. The nuclear magnetic flowmeter in accordance with claim 2, wherein for at least one of the magnetization segments, there is an actuator for rotation of at least one of the inner carrier and the outer carrier.

4. The nuclear magnetic flowmeter in accordance with claim 3, wherein for at least one of the magnetization segments at least the orientation between the inner carrier and the outer carrier producing the minimum magnetic field in the medium and the orientation between the inner carrier and the outer carrier with the maximum magnetic field in the medium are adjustable by the actuator.

5. The nuclear magnetic flowmeter in accordance with claim 1, wherein for at least one of the magnetization segments, the magnetic field of the inner carrier and the magnetic field of the outer carrier are formed such that, at the orientation between the inner carrier and the outer carrier for minimum magnetic field strength n the medium there is essentially no magnetic field in the medium.

6. The nuclear magnetic flowmeter in accordance with claim 1, wherein for at least one of the magnetization segments, the inner carrier is fixed with reference to the measuring tube and the outer carrier is mounted to turn around the axis of rotation of the segment.

7. The nuclear magnetic flowmeter in accordance with claim 1, wherein for at least one of the magnetization segments, the inner carrier on each of opposite ends with reference to the direction of the axis of rotation of a segment is connected securely to a respective segment carrier, wherein the outer carrier with the inner carrier forms at least one radial slide bearing, and wherein the outer carrier with the segment carriers forms at least one axial slide bearing.

8. The nuclear magnetic flowmeter in accordance with claim 1, wherein the at least two magnetization segments comprises at least a third magnetization segment.

9. The nuclear magnetic flowmeter in accordance with claim 8, wherein the third magnetization segment comprises a first partial segment and of a second partial segment, the two partial segments being spaced apart with gap between the first partial segment and the second partial segment providing an adjustable magnetic resistance.

10. The nuclear magnetic flowmeter in accordance with claim 1, wherein the permanent magnets are arranged as a Halbach array.

11. The nuclear magnetic flowmeter in accordance with claim 1, further comprising at least one electromagnet for varying the magnetic field strength in the medium and also for varying the magnetization of the medium, wherein the electromagnet is arranged to produce a magnetic field that is aligned parallel or anti-parallel to the magnetic field of the magnetization produced by the permanent magnets, and wherein the strength of the magnetic field produced by the electromagnet is adjustable.

12. The nuclear magnetic flowmeter in accordance with claim 1, wherein at least one of the magnetization segments is arranged to be able to move along the longitudinal axis of the measuring tube, and wherein the magnetization of the medium is adjustable by adjusting the location of the magnetization segment along the longitudinal axis of the measuring tube relative to a measurement device.

13. The nuclear magnetic flowmeter in accordance with claim 1, wherein the magnetization segments have partial magnetization distances of different length.

14. The nuclear magnetic flowmeter in accordance with claim 1, wherein the strength of the magnetic field produced by the permanent magnets in the medium along any line parallel to the longitudinal axis of the measuring tube is constant over the length of each of the magnetization segments.

15. The nuclear magnetic flowmeter in accordance with claim 1, wherein the strength of the magnetic field produced by the permanent magnets in the medium along any line parallel to the longitudinal axis of the measuring tube is constant over the magnetization distance.

16. The nuclear magnetic flowmeter in accordance with claim 1, wherein the magnetic field produced by the permanent magnets in the medium is homogeneous over the length of each of the magnetization segments.

17. The nuclear magnetic flowmeter in accordance with claim 1, wherein the magnetic field produced by the permanent magnets in the medium is homogeneous over the magnetization distance.

\* \* \* \* \*